US009372886B2

(12) United States Patent
Feng et al.

(10) Patent No.: US 9,372,886 B2
(45) Date of Patent: Jun. 21, 2016

(54) DATA FILTERING IN THE INTERNET OF THINGS

(71) Applicant: International Business Machines Corporation, Armonk, NY (US)

(72) Inventors: Zhen Tan Feng, Beijing (CN); Yi Ge, Beijing (CN); Chi Liu, Beijing (CN); Wei Lu, Beijing (CN); Bo Yang, Beijing (CN); Qi Yu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 530 days.

(21) Appl. No.: 13/869,236

(22) Filed: Apr. 24, 2013

(65) Prior Publication Data

US 2013/0290305 A1  Oct. 31, 2013

(30) Foreign Application Priority Data

Apr. 28, 2012 (CN) .......................... 2012 1 0130414

(51) Int. Cl.
*G06F 17/30* (2006.01)
*H04L 29/08* (2006.01)
*H04W 4/00* (2009.01)

(52) U.S. Cl.
CPC .......... *G06F 17/30424* (2013.01); *H04L 67/12* (2013.01); *H04W 4/005* (2013.01)

(58) Field of Classification Search
CPC ... G06F 17/30424; H04L 67/12; H04W 4/005
See application file for complete search history.

(56) References Cited

U.S. PATENT DOCUMENTS

| | | | | |
|---|---|---|---|---|
| 7,107,282 B1 * | 9/2006 | Yalamanchi | ........ | G06F 17/2241 707/754 |
| 7,958,081 B2 * | 6/2011 | Fitzpatrick | ........ | G06F 17/30867 |
| 8,068,986 B1 | 11/2011 | Shahbazi et al. | | |
| 8,661,100 B2 * | 2/2014 | Owen | ...................... | G07F 9/026 235/375 |
| 2004/0078151 A1 * | 4/2004 | Aljadeff | ..................... | G01S 5/06 702/40 |
| 2004/0103139 A1 * | 5/2004 | Hubbard | ............ | G06Q 30/0212 709/201 |
| 2008/0074496 A1 * | 3/2008 | Venetianer | ......... | G06K 9/00335 348/150 |
| 2009/0210141 A1 * | 8/2009 | Young | .................. | G08G 1/0104 701/119 |
| 2009/0264150 A1 * | 10/2009 | Andreasson | ........... | G01D 21/00 455/556.1 |
| 2010/0293196 A1 * | 11/2010 | Roy | ................... | G06F 17/30551 707/776 |
| 2011/0136433 A1 * | 6/2011 | Tsai | ...................... | H04W 88/10 455/41.2 |
| 2012/0089708 A1 * | 4/2012 | Kim | ........................ | H04L 67/12 709/220 |
| 2012/0184209 A1 * | 7/2012 | Wengrovitz | ............ | H04W 4/02 455/41.2 |
| 2013/0130622 A1 * | 5/2013 | Yang | ..................... | H04W 12/06 455/41.2 |

FOREIGN PATENT DOCUMENTS

CN  101515334 A  8/2009
CN  102201958 A  9/2011

* cited by examiner

*Primary Examiner* — Huawen Peng
(74) *Attorney, Agent, or Firm* — Yee & Associates, P.C.; Mercedes L. Hobson (57) ABSTRACT

This invention relates to the Internet of Things (IOT), and discloses a method and apparatus of data filtering in the IOT, where the IOT includes a plurality of sensor devices. The method includes: inputting an application deployed rule; converting the rule into at least one sub-predicate expression having static predicates and dynamic predicates; inputting data collected by the sensor devices; matching the collected data with the static predicates and the dynamic predicates of the sub-predicate expression in sequence; and distributing matched data to the application. In this invention, a rule is divided into static and dynamic predicates, and a match is performed on static predicates before dynamic predicates, so that the speed of predicate match can be improved and fast and efficient data filtering in the IOT can be achieved.

13 Claims, 5 Drawing Sheets

DATA FILTERING IN THE INTERNET OF THINGS

CROSS-REFERENCE TO RELATED APPLICATION

This application claims priority under 35 U.S.C. §119 from Chinese Patent Application No. 201210130414.7 filed Apr. 28, 2012, the entire contents of which are incorporated herein by reference.

FIELD OF THE INVENTION

The present invention generally relates to the Internet of Things (IOT), and more specifically, to a method and apparatus of data filtering in the IOT.

DESCRIPTION OF THE RELATED ART

The internet of things (IOT) is an important component of the next generation information technology and particularly refers to object-interconnecting networks. Particularly, the IOT refers to, through various information sensing devices, such as sensors, RFID techniques, the GPS system, infrared sensors, laser scanners, gas transducers, and other various apparatus and techniques, sampling any objects or procedures to be monitored, connected or interconnected in real-time, collecting acoustical, optical, thermal, electrical, mechanical, chemical, biological, positional information and various required information, and forming a huge network in conjunction with the Internet. The object of the IOT is to realize connections between objects, objects and persons, all things and networks for the convenience of identification, management and control.

In the IOT, application gateways for data aggregation and distribution are located between application servers and underlying sensor networks. Because the data amount in the IOT is very large, and every application is not necessarily concerned with all of the data, each application must define some rules for data filtering in application gateways, thereby, only IOT data meeting rules defined by an application can be forwarded by an application gateway to the application. Because the data amount in the IOT is very large, and each piece of data must be matched with a set of rules, extremely severe requirement has been raised for data filtering (rule match) engines of application gateways.

In the prior art, data filtering can be realized by Complex Event processing systems. In a Complex Event processing system, an application can predefine event patterns (i.e, sequential relationship between events). A Complex Event processing system can match predefined event patterns while receiving and processing a large amount of events. Once an event pattern is successfully matched, it is notified to the application immediately. Traditional Complex Event processing systems employ the state machine principle to match event patterns. If Complex Event processing systems are directly employed in the IOT, since the number of events (data) is very large in the IOT, more rules must be defined by applications and Complex Event processing systems have to store a lot of state information, so that it is difficult to achieve a rapid and efficient effect for matching events.

The RETE algorithm is another method of data filtering, in which applications define a set of rules based on facts. When some facts are continuously input in the RETE rule engine by clients, the RETE rule engine can infer reasonable conclusions based on a set of received facts and a set of predefined rules. The IOT merely needs to perform filtering on individual data, thus the RETE algorithm can cause too many historical information and storage overhead, which is disadvantage for efficient matching processing.

Therefore, a fast and efficient method of data filtering in the IOT is desired.

SUMMARY OF THE INVENTION

Based on the above problems, a method and an apparatus of data filtering in the IOT are provided in this invention.

According to a first aspect of this invention, a method of data filtering in the IOT is provided, where the IOT includes a plurality of sensor devices. The method includes: inputting an application deployed rule; converting the rule into at least one sub-predicate expression having static predicates and dynamic predicates; inputting data collected by the sensor devices; matching the collected data with the static predicates and dynamic predicates of the sub-predicate expression in sequence; and distributing matched data to the application.

According to a second aspect of this invention, an apparatus of data filtering in the IOT is provided, where the IOT includes a plurality of sensor devices. The apparatus includes: a rule input module configured to input an application deployed rule; a rule conversion module configured to convert the rule into at least one sub-predicate expression having static predicates and dynamic predicates; a data input module configured to input data collected by the sensor devices; a data match module configured to match the collected data with the static predicates and dynamic predicates of the sub-predicate expression in sequence; and a data distributing module configured to distribute matched data to the application.

In the method and apparatus of data filtering in the IOT according to embodiments of this invention, a rule is divided into static and dynamic predicates, and match is performed on static predicates before dynamic predicates, so that the speed of predicate match can be improved and fast and efficient data filtering in the IOT can be achieved.

According to yet another aspect of this invention, a non-transitory article of manufacture tangibly embodying computer readable instructions, which when implemented, cause a computer to perform the steps of the method of data filtering in the IOT.

BRIEF DESCRIPTION OF THE DRAWINGS

In connection with the accompanying drawings, through referring to the description of specific exemplary embodiments below, the present invention itself, its preferable embodiments and objects and advantages of this invention will be better understood.

DETAILED DESCRIPTION OF THE PREFERRED EMBODIMENTS

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Figure 1:
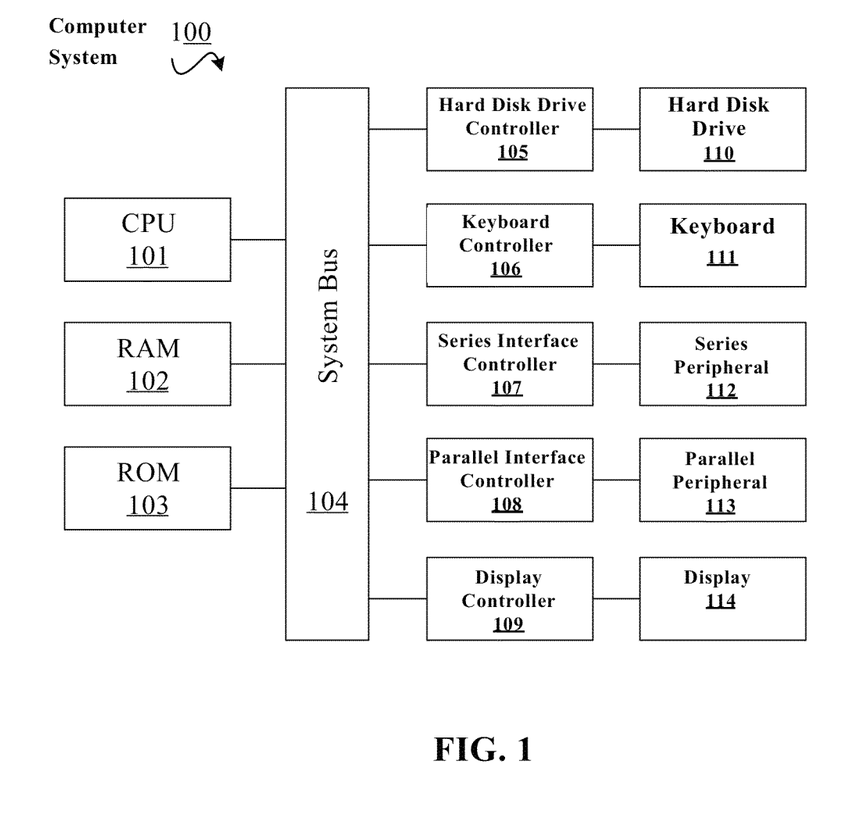
FIG. 1 shows a block diagram of an exemplary computing system 100 suitable for the implementation of this invention.

FIG. 1 shows an exemplary computer system 100, which is applicable to implement embodiments of the present invention. As shown in FIG. 1, computer system 100 can include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 1 is only for exemplary purposes rather than any limitation to the present invention. In some cases, some devices can be added to or removed from computer system 100 based on specific situations.

As will be appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module," or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the above. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the above. In the context of this invention, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including, but not limited to, wireless, wireline, optical fiber cable, RF, etc., or any suitable combination of the foregoing.

Computer program code for carrying out operations for aspects of the present invention can be written in any combination of one or more programming languages, including an object oriented programming language, such as Java, Smalltalk, C++, and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatuses (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture, including instruction means which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented method such that the instructions which execute on the computer or other programmable apparatus provide processes for implementing the functions/acts specified in the flowchart and/or block diagram block or blocks.

Figure 2:
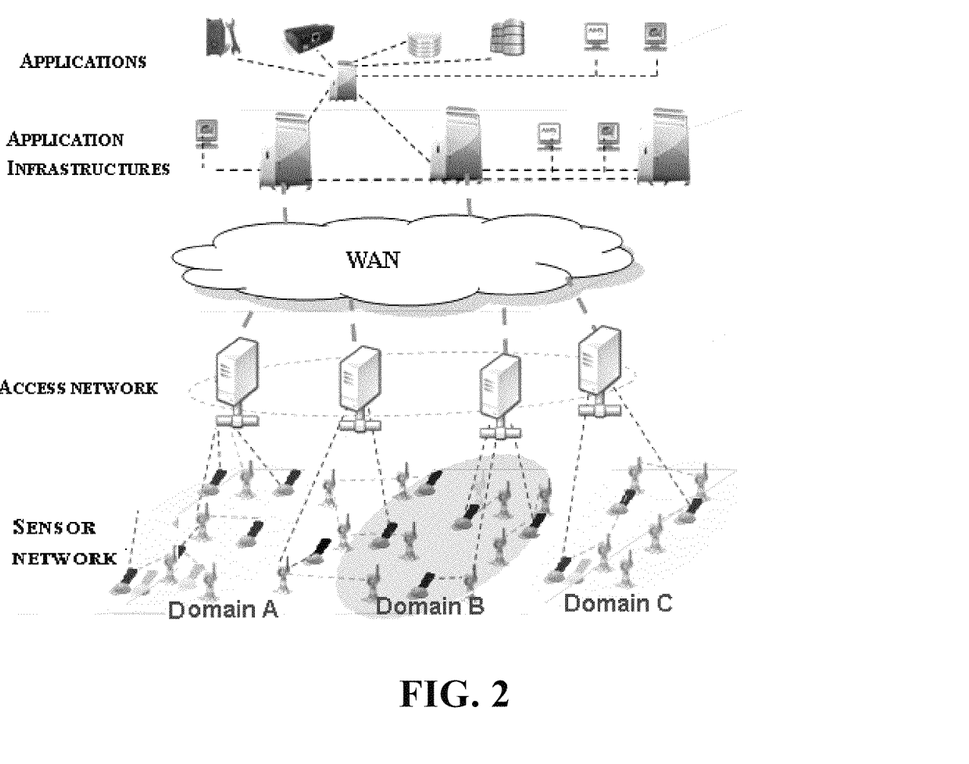
FIG. 2 shows a schematic view of the architecture of the IOT.

Referring now to FIG. 2, it shows a schematic view of the IOT architecture, in which the IOT includes applications, application infrastructures, a wide area network (WAN), an access network, and a sensor network. The sensor network includes a plurality of sensor devices, which collect data information externally, and transmit to the application infrastructures through the WAN. The application infrastructures include an information database and application gateways. Data filtering and distribution are realized in application gateways. In the method of data filtering, it is required to query the information database for the decision of filtering rules.

Figure 3:
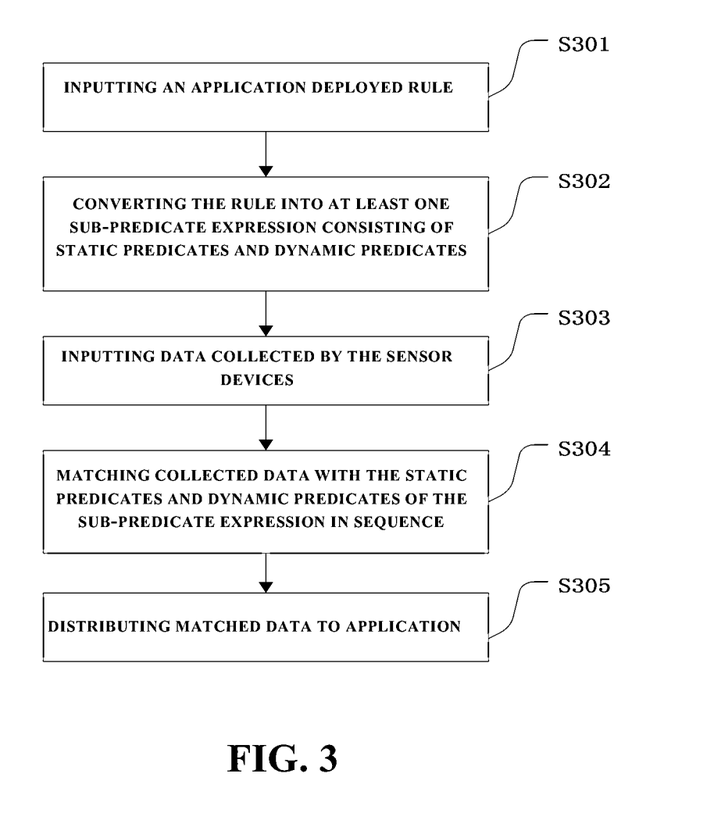
FIG. 3 shows a method of data filtering in the IOT according to an embodiment of this invention.

FIG. 3 shows a method of data filtering in the IOT according to an embodiment of this invention, where the IOT includes a plurality of sensor devices. The method includes: inputting an application deployed rule, at step S301; converting the rule into at least one sub-predicate expression having static predicates and dynamic predicates, at step S302; inputting data collected by the sensor devices, at step S303; matching the collected data with the static predicates and dynamic predicates of the sub-predicate expression, in sequence at step S304; and distributing matched data to the application, at step S305.

In step S301, a rule deployed by an application is input, where the rule is composed of predicates, and can be deployed by the application according to its service logics. Suppose there is a set of rules deployed by applications in the IOT $\Re = \{R_i | i=1, 2, \ldots M\}$, where a predicate is the smallest divisible unit of each rule $R_i$. For example, an application for temperature control can define the following rule $R_1$:

---
IF (devicetype=temperature)
& (value<15)
& (location = 2F)
THEN transform;
　　　　JMSSink2Topic
---

Where rule $R_1$ is a set of predicates, having three predicates as follows:

Predicate 1: devicetype=temperature (representing the type of the sensor device is a temperature sensor);

Predicate 2: value<15 (representing the temperature value collected is less than 15 degrees);

Predicate 3: location=2F (representing the sensor device is located at 2 floor).

In step S302, the rule is converted into at least one sub-predicate expression having static predicates and dynamic predicates. Further, the predicates of the rule are divided into static predicates and dynamic predicates according to sensor device information, where the sensor device information includes data records of static properties of the sensor devices and. where the sensor device information is stored in an information database of the IOT. The sensor device information includes data records of static properties of the sensor devices, such as, device identifier, geographic location, device type, and manufacturer, where static properties imply no variations with time. Static predicates are defined as predicates associated with static properties of sensor devices, for example, Predicates 1 and 3 of the above rule. Generally, in addition to data of static properties, data collected by a sensor device can also include values varied with time, and properties defining those values are dynamic properties, for example, a temperature value measured by a temperature sensor. Dynamic predicates are defined as predicates associated with dynamic properties of data collected by sensor devices, for example, Predicate 2 of the above rule.

According to an embodiment of this invention, the rule is converted into a formula in disjunctive normal form (DFN) including at least one sub-predicate expression having static predicates and dynamic predicates. A disjunctive normal form (DNF) is a standardization (or normalization) of a logical formula which is a disjunction of conjunctive clauses. A logical formula is considered to be in DNF if, and only if, it is a disjunction of one or more conjunctions of one or more literals. The only propositional operators in DNF are AND, OR, and NOT. For example, all of the following formulas are in DNF: $(A \wedge B) \vee C$, $A \vee B$. A rule, $R_i$, is converted into a formula in DNF including at least one sub-predicate expression concatenated by AND, where static predicates are located in front of each sub-predicate expression being evaluated first, and if the value of a static predicate expression is FALSE, it indicates that the value of the sub-predicate expression is FALSE. Thus, the speed of predicate match can be improved through this method. For example, for a certain rule, the predicate expression of which includes a plurality of predicates, those predicates are divided into static predicates and dynamic predicates according to static properties recorded in an information database. For example, the predicate expression of a rule $R_i$ is $A \wedge A (B \vee (D \wedge E))$, which includes four predicates, where B, D are static predicates, and A, E are dynamic predicates. The rule is turned into a DNF formula $(B \wedge A) \vee (D \wedge A \wedge E)$ after conversion, which includes two sub-predicate expressions $(B \wedge A)$ and $(D \wedge A \wedge E)$ respectively, and static predicates B, D are located in front of the sub-predicate expressions. Those skilled in the art can understand that in addition to the manner of DNF conversion, any present and future implementation manners of placing static predicates prior to dynamic predicates using the exchangeable property of predicates, and converting a rule into at least one sub-predicate having static predicates and dynamic predicates are all covered in the scope of this invention.

According to an embodiment of this invention, the method further includes establishing a dynamic predicate match table for each sub-predicate expression, where the dynamic predicate match table records dynamic predicates contained in the sub-predicate expression and addresses of the dynamic predicates in the dynamic predicate matching table.

According to an embodiment of this invention, the method further includes establishing a static distribution table for each sub-predicate expression. Particularly, data records of static properties of sensor devices are matched with static predicates contained in the sub-predicate expression. In response to a TRUE match result, IDs of the sensor devices and addresses in the dynamic predicate match table of dynamic predicates contained in the sub-predicate expression are correspondingly recorded in the static distribution table. Correspondence between each of the IDs of the sensor devices and addresses in the dynamic predicate match table of dynamic predicates contained in a sub-predicate expression can be represented by pointers.

Figure 4:
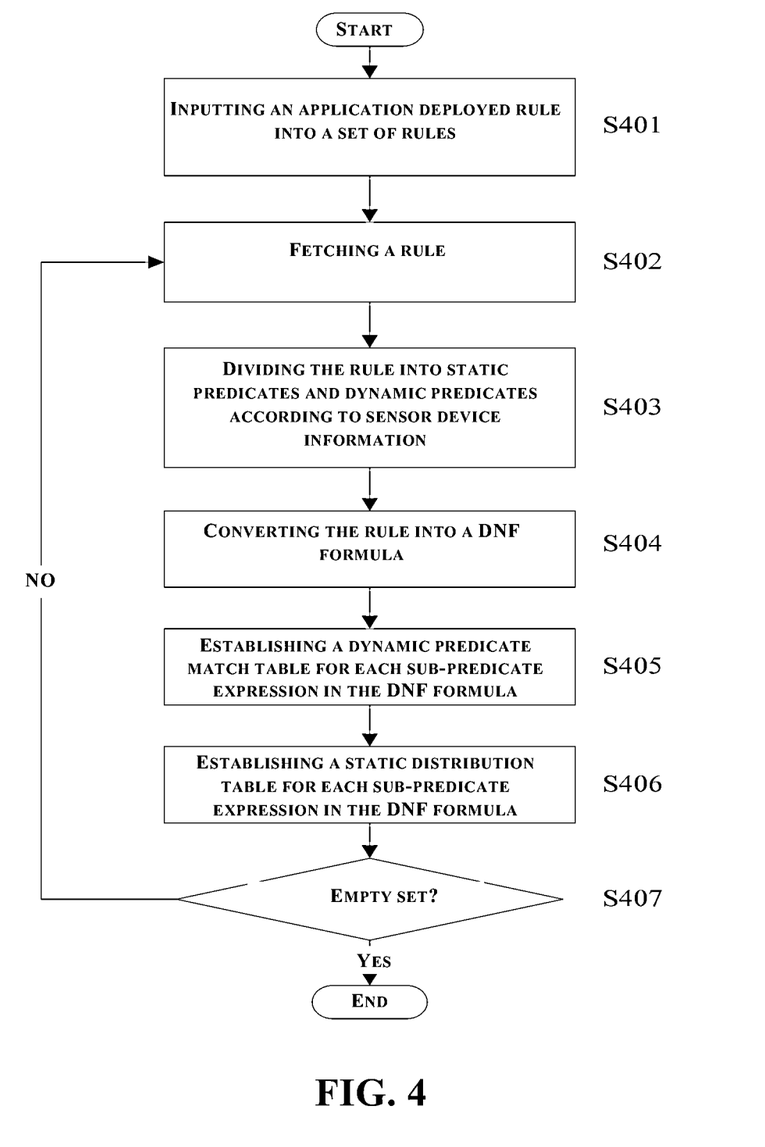
FIG. 4 shows a flowchart of establishing a dynamic predicate match table and a static distribution table of a sub-predicate expression according to an embodiment of this invention.

FIG. 4 shows a flowchart of establishing a dynamic predicate match table and a static distribution table of a sub-predicate expression according to an embodiment of this invention. At step S401, an application deployed rule is inputted into a set of rules. At step S402, a rule is fetched from the set of rules. At step S403, predicates in the rule are divided into static predicates and dynamic predicates according to sensor device information. At step S404, the rule is converted into a DNF formula, where the DNF formula includes at least one sub-predicate expression having static predicates and dynamic predicates. At step S405, for each sub-predicate expression in the DNF formula, a dynamic predicate match table is established. At step S406, for each sub-predicate expression in the DNF formula, a static distribution table is established. At step S407, it is decided whether the set is empty. If the result of the decision is Yes, the process ends. Otherwise if the result of the decision is No, the process returns to step S402.

In step S303, data collected by the sensor devices is inputted. The collected data includes IDs of the sensor devices, dynamic property data, and static property data.

In step S304, the data is matched in sequence with the static predicates and dynamic predicates of the sub-predicate expression. The static distribution table is searched for the device ID contained in the data. If the search result is NULL, the data is discarded. If the search result is TRUE, a corresponding dynamic predicate is retrieved at a corresponding address in the dynamic predicate match table according to a pointer representing correspondence between each of the IDs of the sensor devices and dynamic predicate addresses recorded in the static distribution table. Dynamic property data collected by the device is matched with the retrieved dynamic predicate, after which the pointer is pointed to a next dynamic predicate to be matched. If there are many dynamic predicates to be matched, the dynamic predicates in the dynamic predicate match table can be pointed with a list of pointers. If the match result is TRUE, at step S305, the matched data is sent to the application. If the match result is FALSE, the data is discarded. This invention divides rule match into the match of static predicates and the match of dynamic predicates, speeds up predicate match using a static predicate match table, filters off data failing to meet rules, saves computing overhead of further match of dynamic predicates, and saves data storage overhead at the same time. Furthermore, the match of static predicates and the match of dynamic predicates can be preformed on data in a parallel manner, so that the match speed of dynamic predicates can be improved, and fast and efficient data filtering can be realized.

Example: A following rule is defined by a temperature control application:

IF (devicetype=temperature)
& (value<15)
& (location = 2F)
THEN transform;
JMSSink2Topic Sensor device information stored in the information database includes data records of static properties of sensor devices 1-4. In an embodiment of this invention, the static properties include sensor identifier information, geographic location, and device type, as shown in Table 1.

TABLE 1

| Device identifier | Geographic location | Device type |
| --- | --- | --- |
| ID1 | Floor 1 | Temperature |
| ID2 | Floor 2 | Temperature |
| ID3 | Floor 2 | Moisture |
| ID4 | Floor 2 | Temperature |

Predicates are divided into static predicates and dynamic predicates according to the data records of static properties recorded in the information database:

| static predicates: | A: location = 2F |
| --- | --- |
|  | B: devicetype = temperature |
| dynamic predicates: | C: value < 15 |

The DNF formula of this rule is (A∧ C∧ B), putting static predicates prior to dynamic predicates, the converted DNF formula is (A∧ B∧ C).

A static distribution table and a dynamic predicate match table are established. A predicate expression (A∧ B∧ C) contained in the DNF formula is evaluated for data records of static properties of sensor devices 1-4 in the information database. Because the match results of the static predicates in the predicate expression and the static properties of sensor devices 2 and 4 (geographic location and device type) are TRUE, the IDs of sensor devices 2 and 4 and correspondence between the IDs of sensor devices 2 and 4 and the address of the dynamic predicate C are recorded in the static distribution table, as shown in Table 2. The dynamic predicate match table records the address of the dynamic predicate contained in the predicate expression and the content of the dynamic predicate, as shown in Table 3.

TABLE 2

| Device identifier | Dynamic predicate address |
| --- | --- |
| ID2 | 0x01 |
| ID4 | 0x01 |

TABLE 3

| Dynamic predicate address | Dynamic predicate content |
| --- | --- |
| 0x01 | value < 15 |
| ... | ... |

Data collected by sensor devices 1-4 are inputted:
<deviceID=ID1, Value=20, Location=1F>;
<deviceID=ID2, Value=10, Location=2F, devicetype=temperature>;
<deviceID=ID3, Value=30, Location=2F, devicetype=humanity>;
<deviceID=ID4, Value=40, Location=2F, devicetype=temperature> . . . .

The static distribution table is searched for sensor devices IDs1-4 contained in the data. As a result, the search results of sensor devices ID1 and ID3 are NULL, and then data of sensor devices ID1 and ID3 is discarded; the search results of sensor devices ID2 and ID4 are TRUE, then the corresponding dynamic predicate C is retrieved at the corresponding address, 0X01, in the dynamic predicate match table according to the dynamic predicate corresponding to sensor devices ID2 and ID4 recorded in the static distribution table. Values collected by sensor devices 2 and 4 are matched with the retrieved dynamic predicate C in sequence. The matching result of sensor device 2 is TRUE, and data collected by sensor device 2 is distributed to the application; the matching result of sensor device 4 is FALSE, and the data is discarded.

Figure 5:
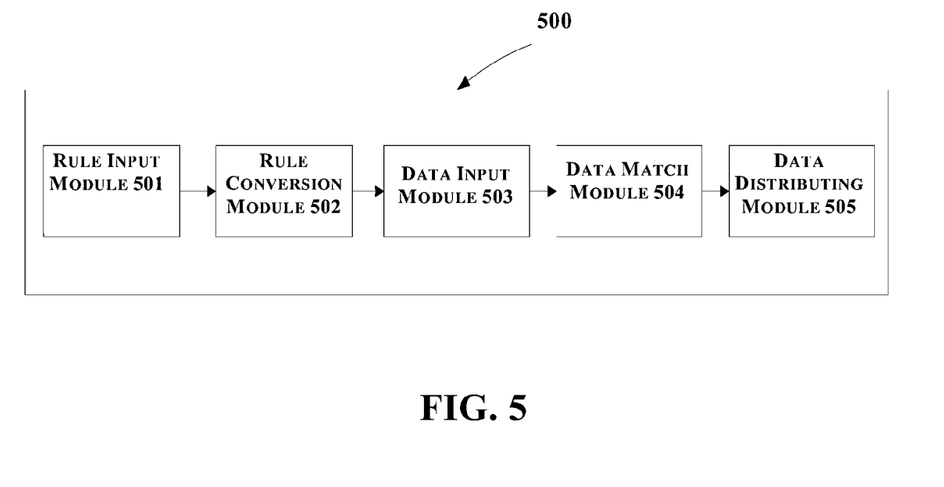
FIG. 5 shows an apparatus 500 of data filtering in the IOT according to an embodiment of this invention.

Based on the same inventive concept, an apparatus of data filtering in the IOT is provided. in this invention. In an application gateway, the apparatus can function as a component of the application gateway for data filtering. FIG. 5 shows apparatus 500 for data filtering in the IOT according to an embodiment of this invention, where the IOT includes a plurality of sensor devices. Apparatus 500 includes: rule input module 501 configured to input an application deployed rule; rule conversion module 502 configured to convert the rule into at least one sub-predicate expression having static predicates and dynamic predicates; data input module 503 configured to input data collected by the sensor devices; data match module 504 configured to match the collected data with the static predicates and dynamic predicates of the sub-predicate expression in sequence; and data distributing module 505 configured to distribute matched data to the application.

The static predicates are defined as predicates related to static properties of sensor devices, and the static predicates are defined as predicates related to dynamic properties of data collected by the sensor devices.

In an embodiment of this invention, rule conversion module 502 includes: a predicate decomposing module configured to decompose predicates of the rule into static predicates and dynamic predicates according to sensor device information, where the sensor device information includes data records of static properties of the sensor devices. Rule conversion module 502 includes a DNF conversion module configured to convert the rule into a DNF formula, where the DNF formula includes at least one sub-predicate expression having static predicates and dynamic predicates.

According to an embodiment of this invention, the rule conversion module further includes: a dynamic predicate match table establishing module configured to establish a dynamic predicate match table of the sub-predicate expression, where the dynamic predicate match table records dynamic predicates contained in the sub-predicate expression and addresses of dynamic predicates in the dynamic predicate match table.

According to an embodiment of this invention, the rule conversion module further includes: a static distribution table establishing module configured to establish a static distribution table of the sub-predicate expression, where the static distribution table records IDs of the sensor devices and addresses in the dynamic predicate match table of dynamic predicates contained in the sub-predicate expression.

According to an embodiment of this invention, the static distribution table establishing module is further configured to match data records of static properties of the sensor devices with static predicates contained in the sub-predicate expression; and in response to a TRUE match result, correspondingly record, in the static distribution table, the IDs of the sensor devices and addresses in the dynamic predicate match table of the dynamic predicates contained in the sub-predicate expression.

According to an embodiment of this invention, the data match module is further configured to: search the static distribution table for the IDs of the sensor devices contained in the collected data; in response to a FALSE search result, discard the collected data; and in response to a TRUE search result, retrieve corresponding dynamic predicates from the dynamic predicate match table according to the addresses in the dynamic predicate match table of dynamic predicates corresponding to the IDs of the sensor devices recorded in the static distribution table.

According to an embodiment of this invention, the data match module is further configured to: match data having dynamic properties in the collected data with the corresponding dynamic predicates that have been retrieved in sequence; in response to a FALSE match result, discard the collected data.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of data filtering in Internet of Things (IOT), wherein the IOT comprises a plurality of sensor devices, the method comprising:
   inputting an application deployed rule;
   converting the application deployed rule by decomposing predicates of the application deployed rule into at least one sub-predicate expression having static predicates and dynamic predicates, wherein converting the application deployed rule by decomposing predicates of the application deployed rule into at least one sub-predicate expression having static predicates and dynamic predicates further comprises:
   establishing a dynamic predicate match table of the sub-predicate expression, wherein the dynamic predicate match table records dynamic predicates contained in the at least one sub-predicate expression and addresses of the dynamic predicates in the dynamic predicate match table; and
   establishing a static distribution table of the sub-predicate expression, wherein the static distribution table records sensor identifiers (IDs) of the sensor devices and addresses in the dynamic predicate match table of the dynamic predicates contained in the at least one sub-predicate expression;
   inputting data collected by the sensor devices;
   matching the data collected with the static predicates and the dynamic predicates of the at least one sub-predicate expression in sequence; and
   distributing matched data to an application.

2. The method according to claim 1, wherein converting the application deployed rule by decomposing predicates of the application deployed rule into at least one sub-predicate expression having static predicates and dynamic predicates comprises:
   decomposing predicates of the application deployed rule into static predicates and dynamic predicates according to sensor device information, wherein the sensor device information includes data records of static properties of the sensor devices; and
   converting the application deployed rule into a disjunctive normal form (DNF) formula, wherein the DNF formula includes the at least one sub-predicate expression having static predicates and dynamic predicates.

3. The method according to claim 1, wherein establishing the static distribution table of the sub-predicate expression comprises:

matching data records of static properties of the sensor devices with the static predicates contained in the at least one sub-predicate expression; and recording, in the static distribution table, the sensor IDs of the sensor devices and addresses in the dynamic predicate match table of the dynamic predicates contained in the at least one sub-predicate expression, in response to a TRUE match result.

4. The method according to claim 1, wherein matching the data collected with the static predicates and the dynamic predicates of the at least one sub-predicate expression in sequence comprises:

searching the static distribution table for the sensor IDs of the sensor devices contained in the data collected;

discarding the data collected, in response to a FALSE search result; and retrieving corresponding dynamic predicates from the dynamic predicate match table according to the addresses in the dynamic predicate match table of dynamic predicates corresponding to the sensor IDs of the sensor devices recorded in the static distribution table, in response to a TRUE search result.

5. The method according to claim 4, wherein retrieving corresponding dynamic predicates from the dynamic predicate match table according to the addresses in the dynamic predicate match table of dynamic predicates corresponding to the sensor IDs of the sensor devices recorded in the static distribution table further comprises:

matching data having dynamic properties in the data collected with the retrieved corresponding dynamic predicates in sequence; and discarding the data collected, in response to a FALSE match result.

6. The method according to claim 1, wherein the static predicates are defined as predicates related to static properties of the sensor devices, and the dynamic predicates are defined as predicates related to dynamic properties of data collected by the sensor devices.

7. An apparatus of data filtering in Internet of Things (IOT), wherein the IOT comprises a plurality of sensor devices, the apparatus comprising:

a rule input module configured to input an application deployed rule;

a rule conversion module configured to convert the application deployed rule by decomposing predicates of the application deployed rule into at least one sub-predicate expression having static predicates and dynamic predicates, wherein the rule conversion module further comprises:

a dynamic predicate match table establishing module configured to establish a dynamic predicate match table of the sub-predicate expression, wherein the dynamic predicate match table records the dynamic predicates contained in the at least one sub-predicate expression and addresses of the dynamic predicates in the dynamic predicate match table; and a static distribution table establishing module configured to establish a static distribution table of the sub-predicate expression, wherein the static distribution table records sensor identifiers (IDs) of the sensor devices and addresses in the dynamic predicate match table of dynamic predicates contained in the at least one sub-predicate expression;

a data input module configured to input data collected by the sensor devices;

a data match module configured to match the data collected with the static predicates and dynamic predicates of the at least one sub-predicate expression in sequence; and a data distributing module configured to distribute matched data to an application.

8. The apparatus according to claim 7, wherein the rule conversion module further comprises:

a predicate decomposing module configured to decompose predicates of the application deployed rule into static predicates and dynamic predicates according to sensor device information, wherein the sensor device information includes data records of static properties of the sensor devices; and a DNF conversion module configured to convert the application deployed rule into a DNF formula, wherein the DNF formula includes the at least one sub-predicate expression having static predicates and dynamic predicates.

9. The apparatus according to claim 7, wherein the static distribution table establishing module is further configured to:

match data records of static properties of the sensor devices with static predicates contained in the at least one sub-predicate expression; and record, in the static distribution table, the sensor IDs of the sensor devices and addresses in the dynamic predicate match table of the dynamic predicates contained in the at least one sub-predicate expression, in response to a TRUE match result.

10. The apparatus according to claim 7, wherein the data match module is further configured to:

search the static distribution table for the sensor IDs of the sensor devices contained in the data collected;

discard the data collected, in response to a FALSE search result; and retrieve corresponding dynamic predicates from the dynamic predicate match table according to the addresses in the dynamic predicate match table of dynamic predicates corresponding to the sensor IDs of the sensor devices recorded in the static distribution table, in response to a TRUE search result.

11. The apparatus according to claim 10, wherein the data match module is further configured to:

match data having dynamic properties in the data collected with the corresponding dynamic predicates that have been retrieved in sequence; and discard the data collected, in response to a FALSE match result.

12. The apparatus according to claim 7, wherein the static predicates are defined as predicates related to static properties of the sensor devices, and the dynamic predicates are defined as predicates related to dynamic properties of data collected by the sensor devices.

13. A non-transitory article of manufacture tangibly embodying computer readable instructions, which when implemented, cause a computer to perform a method for filtering data in Internet of Things (IOT), wherein the IOT comprises a plurality of sensor devices, the method comprising:

inputting an application deployed rule;

converting the application deployed rule by decomposing predicates of the application deployed rule into at least one sub-predicate expression having static predicates and dynamic predicates, wherein converting the application deployed rule by decomposing predicates of the application deployed rule into at least one sub-predicate expression having static predicates and dynamic predicates further comprises:

establishing a dynamic predicate match table of the sub-predicate expression, wherein the dynamic predicate match table records dynamic predicates contained in the at least one sub-predicate expression and addresses of the dynamic predicates in the dynamic predicate match table; and establishing a static distribution table of the sub-predicate expression, wherein the static distribution table records sensor identifiers (IDs) of the sensor devices and addresses in the dynamic predicate match table of the dynamic predicates contained in the at least one sub-predicate expression;

inputting data collected by the sensor devices;

matching the data collected with the static predicates and the dynamic predicates of the at least one sub-predicate expression in sequence; and distributing matched data to an application.

* * * * *